(12) United States Patent  
Jamil et al.

(10) Patent No.: US 9,442,735 B1  
(45) Date of Patent: Sep. 13, 2016

(54) METHOD AND APPARATUS FOR PROCESSING SPECULATIVE, OUT-OF-ORDER MEMORY ACCESS INSTRUCTIONS

(71) Applicant: Marvell International Ltd., Hamilton (BM)

(72) Inventors: Sujat Jamil, Gilbert, AZ (US); R. Frank O'Bleness, Tempe, AZ (US); Tom Hameenanttila, Phoenix, AZ (US); Joseph Delgross, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 729 days.

(21) Appl. No.: 13/856,653

(22) Filed: Apr. 4, 2013

Related U.S. Application Data

(60) Provisional application No. 61/623,878, filed on Apr. 13, 2012.

(51) Int. Cl.
    *G06F 9/30*    (2006.01)
    *G06F 9/38*    (2006.01)

(52) U.S. Cl.
    CPC ......... *G06F 9/3814* (2013.01); *G06F 9/3826* (2013.01); *G06F 9/3842* (2013.01); *G06F 9/3855* (2013.01)

(58) Field of Classification Search
    None
    See application file for complete search history.

(56) References Cited

U.S. PATENT DOCUMENTS

| 5,751,983 | A  | * | 5/1998  | Abramson | G06F 9/3834 712/216 |
| 6,011,908 | A  | * | 1/2000  | Wing     | G06F 9/3808 712/E9.037 |
| 6,038,657 | A  | * | 3/2000  | Favor    | G06F 7/74 712/214 |
| 6,212,622 | B1 | * | 4/2001  | Witt     | G06F 9/3814 712/2 |
| 6,463,523 | B1 | * | 10/2002 | Kessler  | G06F 9/3814 712/202 |
| 6,557,095 | B1 | * | 4/2003  | Henstrom | G06F 9/3836 712/207 |
| 6,694,424 | B1 | * | 2/2004  | Keller   | G06F 9/3834 712/216 |

(Continued)

OTHER PUBLICATIONS

'Improved Sequence-Based Speculation Techniques for Implementing Memory Consistency' by Colin Blundell et al., University of Pennsylvania Department of Computer and Information Science Technical Report No. MS-CIS-08-18, May 2008.*

(Continued)

*Primary Examiner* — Steven Snyder

(57) ABSTRACT

Apparatus having corresponding methods and computer-readable media comprise: a speculative store buffer memory; and a speculative store buffer controller comprising a store address comparator to compare an address of a received store instruction with addresses of store instructions allocated in the speculative store buffer memory, and a store age comparator to compare an age of the received store instruction with an age of a matching store instruction allocated in the speculative store buffer memory, wherein the speculative store buffer controller replaces the store instruction allocated in the speculative store buffer memory with the received store instruction responsive to the store instruction allocated in the speculative store buffer memory being younger than the received store instruction.

20 Claims, 6 Drawing Sheets

(56) References Cited

U.S. PATENT DOCUMENTS

| | | | | |
|---|---|---|---|---|
| 7,065,632 B1* | 6/2006 | Col | | G06F 9/3834 712/218 |
| 7,284,102 B2* | 10/2007 | Guthrie | | G06F 9/30043 710/40 |
| 7,461,238 B2* | 12/2008 | Luick | | G06F 9/3853 712/216 |
| 7,849,290 B2* | 12/2010 | Cypher | | G06F 9/3834 712/216 |
| 8,918,625 B1* | 12/2014 | O'Bleness | | G06F 9/3834 712/214 |
| 8,943,273 B1* | 1/2015 | Jamil | | G06F 9/30043 711/126 |
| 2005/0010744 A1* | 1/2005 | Filippo | | G06F 9/3834 712/225 |
| 2006/0095734 A1* | 5/2006 | Filippo | | G06F 9/3838 712/218 |
| 2008/0005533 A1* | 1/2008 | Altman | | G06F 9/3834 712/23 |
| 2008/0104326 A1* | 5/2008 | Cypher | | G06F 12/0842 711/122 |
| 2009/0019272 A1* | 1/2009 | Cypher | | G06F 9/3842 712/234 |
| 2009/0210679 A1* | 8/2009 | Tsai | | G06F 9/3834 712/225 |
| 2010/0306506 A1* | 12/2010 | Hooker | | G06F 9/3806 712/216 |
| 2011/0040955 A1* | 2/2011 | Hooker | | G06F 9/30043 712/225 |

OTHER PUBLICATIONS

'Issues in the Design of Store Buffers in Dynamically Scheduled Processors' by Ravi Bhargava and Lizy K. John, copyright 2000, IEEE.*

* cited by examiner

```
       C = A + B where A, B, and C are all arrays
       for (i=0; i<=ARRAYSIZE; i++) {C[i] = A[i] + B[i] }

Loop:  LDR R1 [R10], #stride
       LDR R2 [R11], #stride
       ADD R3, R1, R2
       STR R3 [R12], #stride
       ADD R4, R4, #1
       CMPEQ R4, #ARRAYSIZE
       BNE Loop
```

FIG. 1

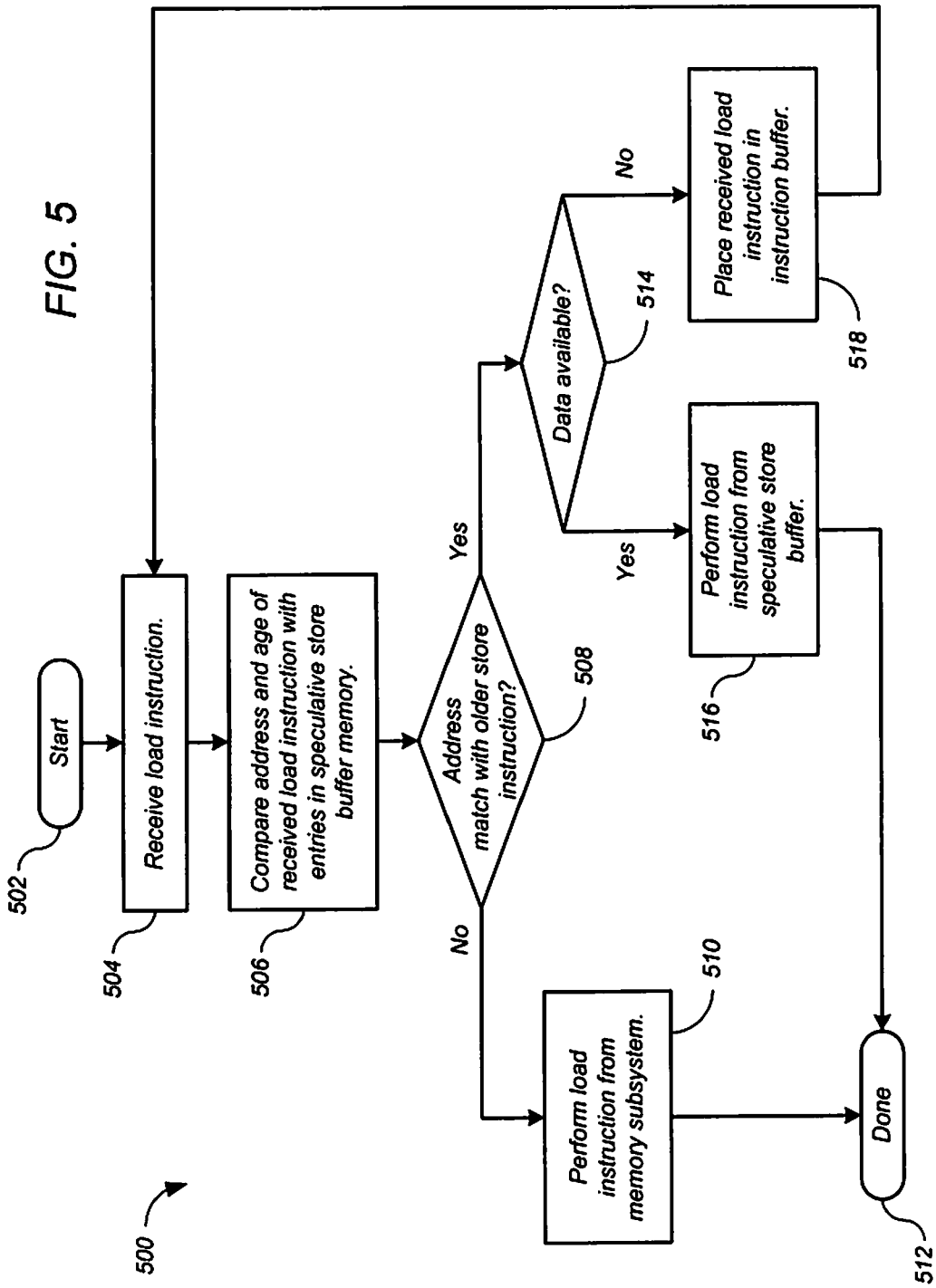

METHOD AND APPARATUS FOR PROCESSING SPECULATIVE, OUT-OF-ORDER MEMORY ACCESS INSTRUCTIONS

CROSS-REFERENCE TO RELATED APPLICATIONS

This claims the benefit of U.S. Provisional Patent Application Ser. No. 61/623,878, filed on Apr. 13, 2012, entitled "MEMORY DISAMBIGUATION METHOD AND APPARATUS FOR ENABLING SPECULATIVE, OUT-OF-ORDER PROCESSING OF STORE INSTRUCTIONS," the disclosure thereof incorporated by reference herein in its entirety.

FIELD

The present disclosure relates generally to the field of processor microarchitecture. More particularly, the present disclosure relates to the processing of speculative, out-of-order memory access instructions.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Processors utilize out-of-order processing of instructions to improve performance through latency hiding. The performance upside can be limited by the extent that loads and stores can be reordered in the presence of stores to correctly handle memory data hazards. Current solutions allow loads to reorder with stores, or stores to reorder with loads, do not allow stores to reorder with other stores due to the complexities involved.

In simpler, in-order processors, instructions are processed in program order, that is, in the order the instructions appear in the computer program. Some instructions have long processing latencies. One example is a complex arithmetic operation. But much more commonly, a memory access instruction, such as a load or store, is likely to have long latency when the access misses the built-in caches. In presence of such a long-latency instruction in an in-order processor, all subsequent instructions are stalled until the long-latency instruction has completed. To avoid the penalty of such stalls, more aggressive, out-of-order processors have been developed. In these out-of-order processors, rather than executing in program order, instructions execute as soon as associated operands are available.

Dependencies among source operands and destination operands require resolution to enable out-of-order processing. When the operands are registers, the dependencies are relatively easy to evaluate because register names are specified in the instruction. In addition, because architecture register name space is relatively quite limited (for example, to only 32 architectural registers), output dependencies (also known as write-after-write hazards) and anti-dependencies (also known as write-after-read hazards) are resolvable through a technique known as register renaming. But with memory access instructions (load and stores), the operand address is only known when the register source(s) to generate the address is available and the instruction has been executed to generate the operand address. With the absence of a known address, ambiguity remains regarding dependencies. In addition, memory address space is much larger than register address space (for example, $2^{32}$ memory locations in a 32-bit processor). Finally, speculative execution, that is, execution in the shadow of an unresolved branch or a potentially excepting instruction, also adds additional ambiguity on dependencies.

Much of common execution is in loops of the same code executing repeatedly. One such loop is shown in FIG. 1. Many of these loop iterations include loads and stores from different elements of a large data structure. Because loads from memory are high latency operations, it is advantageous for the processor to unroll the loop in hardware and execute younger load instructions from later iterations out of program order with respect to older stores from earlier iterations. In addition, because it is likely that the loads may have variable access latencies, the loads may also complete out of program order, so the corresponding stores would ideally execute out of order. Prior art solutions allow young loads to speculatively execute before older stores or younger stores to speculatively execute before older loads, but do not permit stores to reorder among themselves. Traditional methods that permit younger stores to execute prior to older loads rely on the stores allocating to a speculative store buffer and only committing the store when all prior loads and stores are complete, and no prior instructions have been determined to be able to change control flow of the program through branching or exceptions. This enables older loads to see the committed value in memory while younger loads see the speculative value in the speculative store buffer. This method by itself does not work with executing stores out of order because in the case of multiple stores to overlapping addresses, (a) the store buffer does not have a temporal relationship among multiple entries to overlapping addresses, and even if that was feasible to maintain, (b) it is a non-trivial task to dynamically merge data from multiple outstanding stores to bypass to a younger load. Unlike a traditional, committed write-merging buffer, the data from the multiple stores cannot be combined in a single storage location because some of the stores may not commit and there may be loads interspersed among the stores in program order.

SUMMARY

In general, in one aspect, an embodiment features an apparatus comprising: a speculative store buffer memory; and a speculative store buffer controller configured to receive store instructions, wherein the speculative store buffer controller comprises a store address comparator configured to compare an address of one of the received store instructions with addresses of the store instructions allocated in the speculative store buffer memory, and a store age comparator configured to compare an age of the one of the received store instructions with an age of one of the store instructions allocated in the speculative store buffer memory responsive to the store address comparator finding a match between the address of the one of the received store instructions and the address of the one of the store instructions, wherein the speculative store buffer controller is configured to replace the one of the store instructions allocated in the speculative store buffer memory with the one of the received store instructions responsive to the one of the store instructions being younger than the one of the received store instructions.

Embodiments of the apparatus can include one or more of the following features. In some embodiments, the speculative store buffer controller is further configured to allocate the one of the received store instructions to the speculative store buffer memory responsive to the store address comparator finding no match between the address of the one of the received store instructions and the addresses of the store instructions allocated in the speculative store buffer memory. Some embodiments comprise an instruction queue configured to issue the store instructions speculatively and out of order. Some embodiments comprise an instruction buffer configured to buffer the received store instruction, wherein the speculative store buffer controller is further configured to commit the one of the received store instructions from the instruction buffer to a memory subsystem, and to remove the one of the received store instructions from the instruction buffer, responsive to i) all older store instructions completing, ii) all older load instructions completing, iii) the one of the received store instructions being not speculative, and iv) data for the one of the received store instructions being available. Some embodiments comprise a load tracking buffer configured to i) buffer speculative load instructions, and ii) compare the address of the one of the received store instructions with addresses of the speculative load instructions in the load tracking buffer, wherein, responsive to the address of the one of the received store instructions matching an address of an older one of the speculative load instructions, the speculative store buffer controller restarts execution of a program comprising the store instructions from an oldest one of the speculative load instructions having a matching address. In some embodiments, the speculative store buffer controller is further configured to receive load instructions, and wherein the apparatus further comprises: a load address comparator configured to compare an address of one of the received load instructions with addresses of the store instructions allocated in the speculative store buffer memory; and a load age comparator configured to compare an age of the one of the received load instructions with an age of one of the store instructions allocated in the speculative store buffer memory responsive to the load address comparator finding a match between the address of the one of the received load instructions and the address of the one of the store instructions. In some embodiments, the speculative store buffer controller is further configured to perform the one of the received load instructions from a memory subsystem responsive to the load age comparator not finding the one of the store instructions allocated in the speculative store buffer memory to be older than the one of the received load instructions. In some embodiments, the speculative store buffer controller is further configured to perform the one of the received load instructions from the speculative store buffer responsive to i) the load age comparator finding the one of the store instructions to be older than the one of the received load instructions, and ii) data for the one of the store instructions being available. Some embodiments comprise an instruction buffer; wherein the speculative store buffer controller is further configured to buffer the one of the received store instructions in the instruction buffer responsive to i) the load age comparator finding the one of the store instructions to be older than the one of the received load instructions, and ii) data for the one of the store instructions not being available. Some embodiments comprise a microprocessor comprising the apparatus.

In general, in one aspect, an embodiment features a method comprising: receiving store instructions; comparing an address of one of the received store instructions with addresses of the store instructions allocated in a speculative store buffer memory; comparing an age of the one of the received store instructions with an age of one of the store instructions allocated in the speculative store buffer memory responsive to finding a match between the address of the one of the received store instructions and the address of the one of the store instructions; and replacing the one of the store instructions allocated in the speculative store buffer memory with the one of the received store instructions responsive to the one of the store instructions being younger than the one of the received store instructions.

Embodiments of the method can include one or more of the following features. Some embodiments comprise allocating the one of the received store instructions to the speculative store buffer memory responsive to finding no match between the address of the one of the received store instructions and the addresses of the store instructions allocated in the speculative store buffer memory. Some embodiments comprise issuing the store instructions speculatively and out of order. Some embodiments comprise buffering the received store instruction in an instruction buffer; committing the one of the received store instructions to a memory subsystem, and removing the one of the received store instructions from the instruction buffer, responsive to i) all older store instructions completing, ii) all older load instructions completing, iii) the one of the received store instructions being not speculative, and iv) data for the one of the received store instructions being available. Some embodiments comprise buffering speculative load instructions in a load tracking buffer; comparing the address of the one of the received store instructions with addresses of the speculative load instructions in the load tracking buffer; and restarting execution of a program comprising the store instructions from an oldest one of the speculative load instructions having a matching address responsive to the address of the one of the received store instructions matching an address of an older one of the speculative load instructions.

In general, in one aspect, an embodiment features computer-readable media embodying instructions executable by a computer to perform functions comprising: receiving store instructions; comparing an address of one of the received store instructions with addresses of the store instructions allocated in a speculative store buffer memory; comparing an age of the one of the received store instructions with an age of one of the store instructions allocated in the speculative store buffer memory responsive to finding a match between the address of the one of the received store instructions and the address of the one of the store instructions; and replacing the one of the store instructions allocated in the speculative store buffer memory with the one of the received store instructions responsive to the one of the store instructions being younger than the one of the received store instructions.

Embodiments of the computer-readable media can include one or more of the following features. In some embodiments, the functions further comprise: allocating the one of the received store instructions to the speculative store buffer memory responsive to finding no match between the address of the one of the received store instructions and the addresses of the store instructions allocated in the speculative store buffer memory. In some embodiments, the functions further comprise: issuing the store instructions speculatively and out of order. In some embodiments, the functions further comprise: buffering the received store instruction in an instruction buffer; committing the one of the received store instructions to a memory subsystem, and removing the one of the received store instructions from the instruction buffer, responsive to i) all older store instructions completing, ii) all older load instructions completing, iii) the one of the received store instructions being not speculative, and iv) data for the one of the received store instructions being available. In some embodiments, the functions further comprise: buffering speculative load instructions in a load tracking buffer; comparing the address of the one of the received store instructions with addresses of the speculative load instructions in the load tracking buffer; and restarting execution of a program comprising the store instructions from an oldest one of the speculative load instructions having a matching address responsive to the address of the one of the received store instructions matching an address of an older one of the speculative load instructions.

The details of one or more implementations are set forth in the accompanying drawings and the description below. Other features will be apparent from the description and drawings, and from the claims.

DESCRIPTION OF DRAWINGS

FIG. 1 shows a conventional loop of the same code executed repeatedly.

FIG. 5 shows a load process for the speculative store buffer of FIGS. 2 and 3 according to some embodiments.

Figure 2:
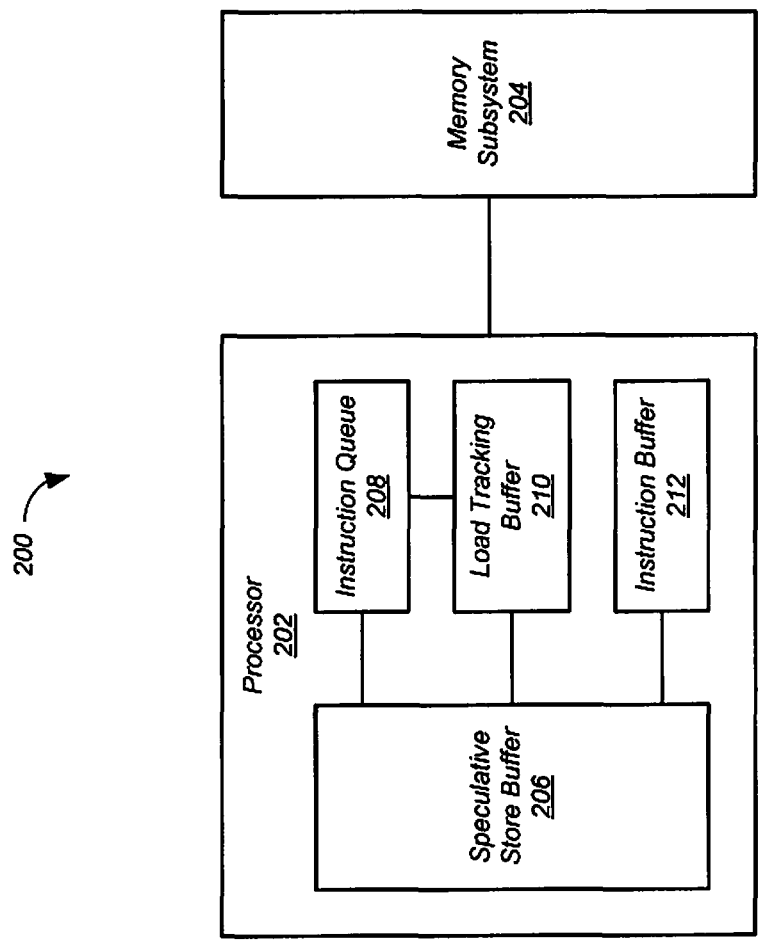
FIG. 2 shows elements of a processing system according to some embodiments.

The leading digit(s) of each reference numeral used in this specification indicates the number of the drawing in which the reference numeral first appears.

DETAILED DESCRIPTION

Embodiments of the present disclosure enable stores to be executed out of order with respect to other stores for out-of-order processor microarchitectures that support instruction replay. Stores executed speculatively, and out of program order, compare their addresses against all currently-tracked stores in a speculative store buffer. If there is no address match, the store allocates in the speculative store buffer, with store data if available, without if not. If there is an address match, an instruction age comparison mechanism determines whether the store already allocated is younger or older. If younger, the older store replaces the allocated store. If older, the younger store does not allocate. Either way, the data in the entry is attributed as invalid. A store executing speculatively is placed in an instruction buffer for subsequent replay when no longer speculative, all prior loads and stores have committed, and its store data register is available. A load with an address matching an older speculative store buffer entry either receives data from the entry if valid, or if not valid, is placed in an instruction buffer for future replay when no longer speculative and all prior loads and stores have committed.

FIG. 2 shows elements of a processing system 200 according to some embodiments. Although in the described embodiments the elements of the processing system 200 are presented in one arrangement, other embodiments may feature other arrangements. For example, elements of the processing system 200 can be implemented in hardware, software, or combinations thereof.

Referring to FIG. 2, the processing system 200 includes a processor 202 and a memory subsystem 204. The processor 202 can be fabricated as an integrated circuit. The memory subsystem 204 can include semiconductor memories, hard disks, and the like. The processor 202 includes a speculative store buffer 206, an instruction queue 208, a load tracking buffer 210, and an instruction buffer 212. In some embodiments, the instruction queue 208 and the instruction buffer 212 may be implemented together as a single component.

Figure 3:
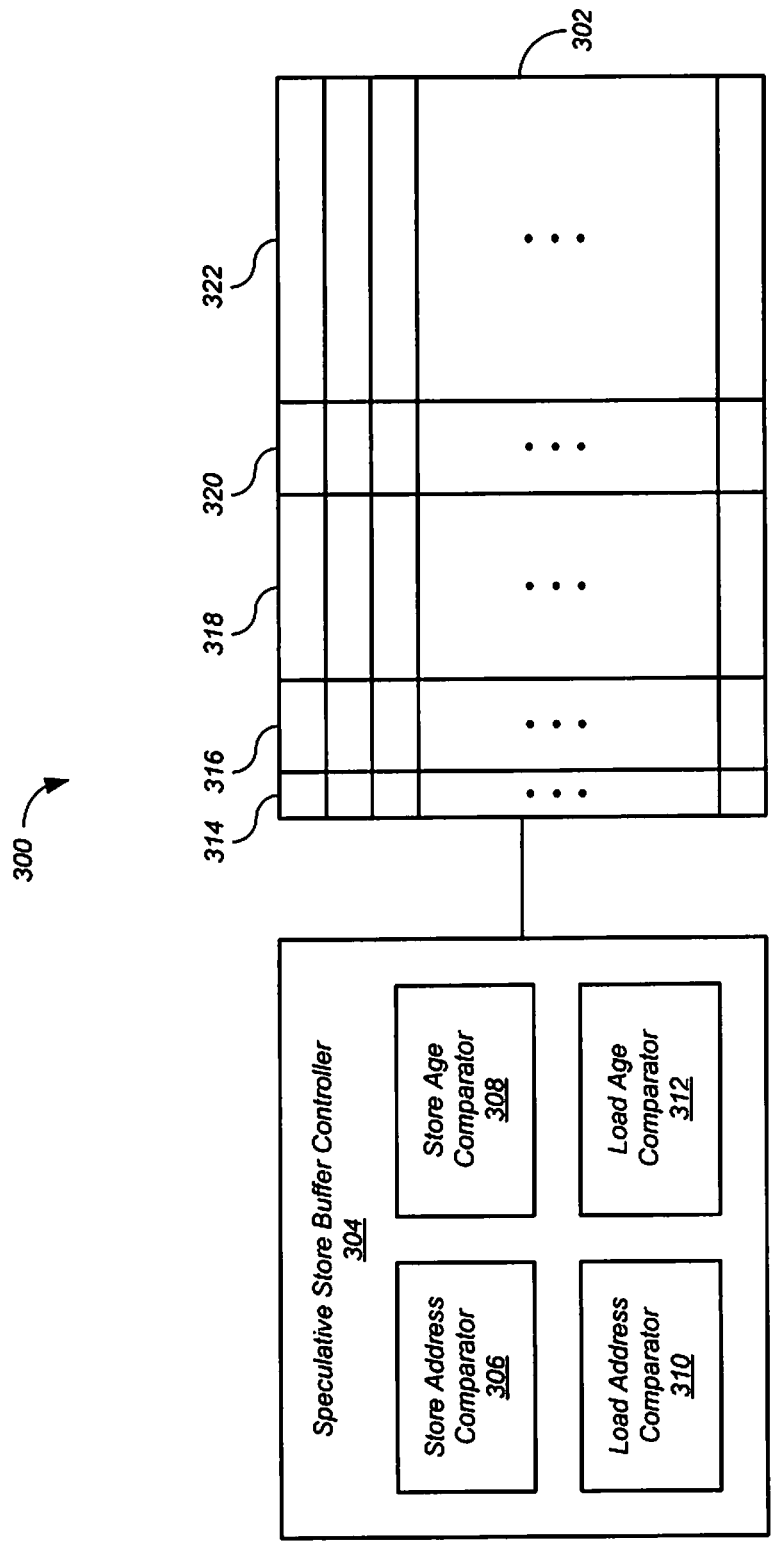
FIG. 3 shows elements of the speculative store buffer of FIG. 2 according to some embodiments.

FIG. 3 shows elements of the speculative store buffer 206 of FIG. 2 according to some embodiments. Although in the described embodiments the elements of the speculative store buffer 206 are presented in one arrangement, other embodiments may feature other arrangements. For example, elements of the speculative store buffer 206 can be implemented in hardware, software, or combinations thereof.

Referring to FIG. 3, the speculative store buffer 206 includes a speculative store buffer memory 302 and a speculative store buffer controller 304. The speculative store buffer controller 304 includes a store address comparator 306, a store age comparator 308, a load address comparator 310, and a load age comparator 312. Each entry in the speculative store buffer memory 302 includes an entry valid field 314, an instruction ID field 316, an address field 318, a data valid field 320, and a data field 322.

Figure 4A:
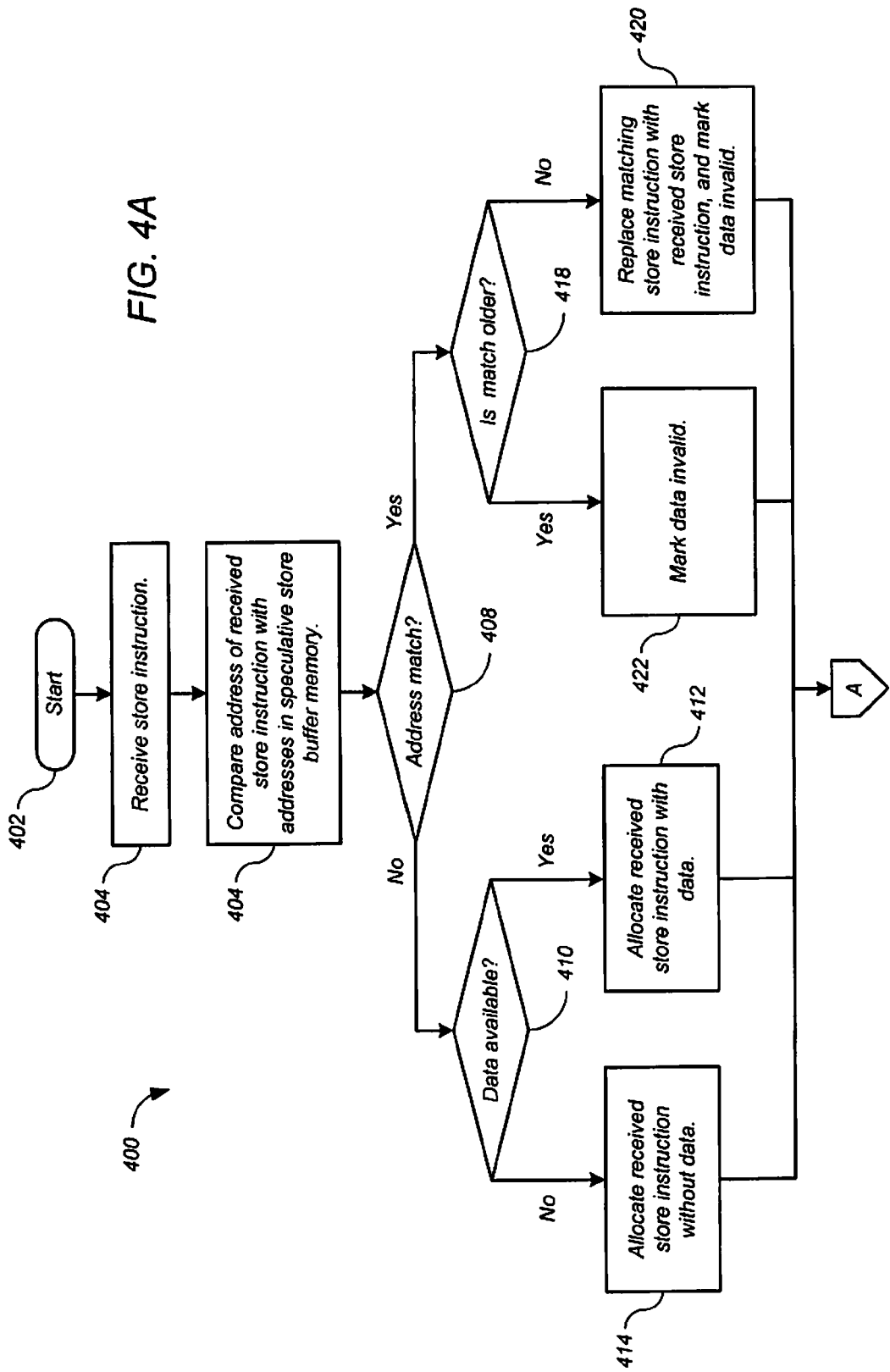
FIGS. 4A and 4B show a store process for the speculative store buffer of FIGS. 2 and 3 according to some embodiments.
Figure 4B:
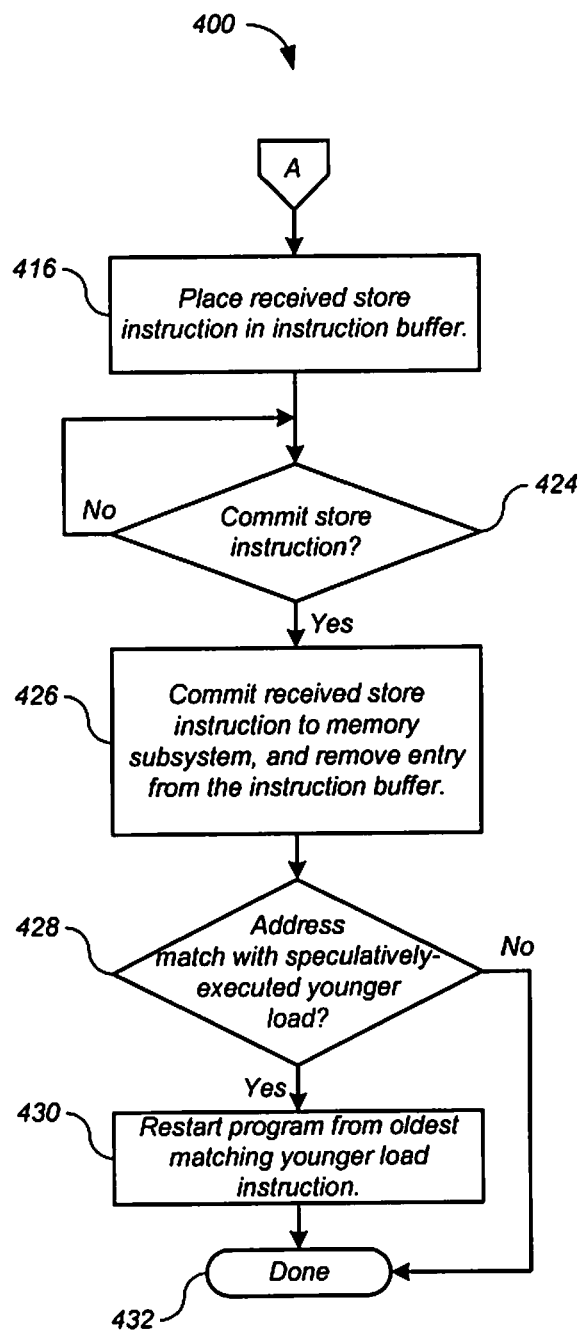

FIGS. 4A and 4B show a store process 400 for the speculative store buffer 206 of FIGS. 2 and 3 according to some embodiments. Although in the described embodiments the elements of process 400 are presented in one arrangement, other embodiments may feature other arrangements. For example, in various embodiments, some or all of the elements of process 400 can be executed in a different order, concurrently, and the like. Also some elements of process 400 may not be performed, and may not be executed immediately after each other. In addition, some or all of the elements of process 400 can be performed automatically, that is, without human intervention.

Referring to FIGS. 4A and 4B, at 402, the process 400 begins. At 404, the speculative store buffer controller 304 receives a store instruction from the instruction queue 208. At 406, the store address comparator 306 compares the address of the received store instruction with the addresses of the store instructions already allocated in the speculative store buffer memory 302. At 408, if there is no address match, and at 410, the store data for the received store instruction is available, then at 412, the speculative store buffer controller 304 allocates the received store instruction to the speculative store buffer memory 302 with the store data. But, at 408, if there is no address match, and at 410, the store data for the received store instruction is not available, then at 414, the speculative store buffer controller 304 allocates the received store instruction to the speculative store buffer memory 302 without the store data. In either case, at 416, the speculative store buffer controller 304 also places the received store instruction in the instruction buffer 212.

At 408, if there is an address match, then at 418, the store age comparator 308 compares the age of the received store instruction with the age of the matching store instruction allocated in the speculative store buffer memory 302. When the matching store instruction is younger than the received store instruction, then at 420, the speculative store buffer controller 304 replaces the matching store instruction with the received store instruction, and marks the data as invalid in the data valid field 320. The speculative store buffer controller 304 accomplishes the replacement by updating the instruction ID field 316 with the ID of the received store instruction. But, at 418, when the matching store instruction is older than the received store instruction, then at 422, the speculative store buffer controller 304 marks the data as invalid in the data valid field 320. In either case, at 416, the speculative store buffer controller 304 also places the received store instruction in the instruction buffer 212.

After placing the received store instruction in the instruction buffer 212 (at 416), at 424, the speculative store buffer controller 304 determines whether the received store instruction should be committed to the memory subsystem 204. In particular, the speculative store buffer controller 304 determines whether the following conditions are true: i) all of the older store instructions have completed, ii) all of the older load instructions have completed, iii) the received store instruction is not speculative, and iv) the data for the received store instruction is available. If all of the conditions are true, then at 426, the speculative store buffer controller 304 commits the received store instruction to the memory subsystem 204, and removes the corresponding entry from the instruction buffer 212. If any of the conditions is false, then process 400 repeats the determination, at 424.

After committing the received store instruction to the memory subsystem 204 (at 426), then at 428, the speculative store buffer controller 304 determines whether the address of the committed store instruction matches the address of any speculatively-executed younger load instruction stored in the load tracking buffer 210. If there is no match, then at 432, process 400 ends. But if there is a match, then at 430, the speculative store buffer controller 304 restarts the program from the oldest matching younger load instruction, and then at 432, process 400 ends.

FIG. 5 shows a load process 500 for the speculative store buffer 206 of FIGS. 2 and 3 according to some embodiments. Although in the described embodiments the elements of process 500 are presented in one arrangement, other embodiments may feature other arrangements. For example, in various embodiments, some or all of the elements of process 500 can be executed in a different order, concurrently, and the like. Also some elements of process 500 may not be performed, and may not be executed immediately after each other. In addition, some or all of the elements of process 500 can be performed automatically, that is, without human intervention.

Referring to FIG. 5, at 502, the process 500 begins. At 504, the speculative store buffer controller 304 receives a load instruction from the instruction queue 208. At 506, the load address comparator 310 compares the address of the received load instruction with the addresses of the store instructions already allocated in the speculative store buffer memory 302, and if a match is found, the load age comparator 312 compares the age of the received load instruction with the age of the matching store instruction allocated in the speculative store buffer memory 302.

At 508, if no matching store instruction allocated in the speculative store buffer memory 302 is older than the received load instruction, then at 510, the speculative store buffer controller 304 performs the received load instruction from the memory subsystem 204. Then, at 512, process 500 ends.

At 508, if a matching store instruction allocated in the speculative store buffer memory 302 is older than the received load instruction, and at 514, the store data for the matching store instruction is available, then at 516, the speculative store buffer controller 304 performs the received load instruction from the speculative store buffer memory 302. Then, at 512, process 500 ends.

At 508, if a matching store instruction allocated in the speculative store buffer memory 302 is older than the received load instruction, and at 514, the store data for the matching store instruction is not available, then at 518, the speculative store buffer controller 304 places the received store instruction in the instruction buffer 212. Process 500 then resumes, at 504.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. An apparatus comprising:
   a speculative store buffer memory; and
   a speculative store buffer controller configured to receive store instructions, wherein the speculative store buffer controller comprises:
   a store address comparator configured to compare an address of one of the received store instructions with addresses of store instructions allocated in the speculative store buffer memory; and
   a store age comparator configured to compare an age of the one of the received store instructions with an age of one of the store instructions allocated in the speculative store buffer memory responsive to the store address comparator finding a match between the address of the one of the received store instructions and the address of the one of the store instructions, wherein the speculative store buffer controller is configured to replace the one of the store instructions allocated in the speculative store buffer memory with the one of the received store instructions responsive to the one of the store instructions allocated in the speculative store buffer memory being younger than the one of the received store instructions.

2. The apparatus of claim 1, wherein:
the speculative store buffer controller is further configured to allocate the one of the received store instructions to the speculative store buffer memory responsive to the store address comparator finding no match between the address of the one of the received store instructions and the addresses of the store instructions allocated in the speculative store buffer memory.

3. The apparatus of claim 1, further comprising:
an instruction queue configured to issue the store instructions received at the speculative store buffer controller speculatively and out of order.

4. The apparatus of claim 2, further comprising:
an instruction buffer configured to buffer the received store instructions,
wherein the speculative store buffer controller is further configured to commit the one of the received store instructions from the instruction buffer to a memory subsystem, and to remove the one of the received store instructions from the instruction buffer, responsive to:
i) all older store instructions completing;
ii) all older load instructions completing;
iii) the one of the received store instructions being not speculative; and
iv) data for the one of the received store instructions being available.

5. The apparatus of claim 4, further comprising:
a load tracking buffer configured to:
i) buffer speculative load instructions; and
ii) compare the address of the one of the received store instructions with addresses of the speculative load instructions in the load tracking buffer,
wherein, responsive to the address of the one of the received store instructions matching an address of an older one of the speculative load instructions, the speculative store buffer controller restarts execution of a program comprising the store instructions from an oldest one of the speculative load instructions having a matching address.

6. The apparatus of claim 1, wherein the speculative store buffer controller is further configured to receive load instructions, and wherein the apparatus further comprises:
a load address comparator configured to compare an address of one of the received load instructions with addresses of the store instructions allocated in the speculative store buffer memory; and
a load age comparator configured to compare an age of the one of the received load instructions with an age of one of the store instructions allocated in the speculative store buffer memory responsive to the load address comparator finding a match between the address of the one of the received load instructions and the address of the one of the store instructions allocated in the speculative store buffer memory.

7. The apparatus of claim 6, wherein:
the speculative store buffer controller is further configured to perform the one of the received load instructions from a memory subsystem responsive to the load age comparator not finding the one of the store instructions allocated in the speculative store buffer memory to be older than the one of the received load instructions.

8. The apparatus of claim 6, wherein:
the speculative store buffer controller is further configured to perform the one of the received load instructions from the speculative store buffer responsive to:
i) the load age comparator finding the one of the store instructions to be older than the one of the received load instructions; and
ii) data for the one of the store instructions being available.

9. The apparatus of claim 6, further comprising:
an instruction buffer;
wherein the speculative store buffer controller is further configured to buffer the one of the received store instructions in the instruction buffer responsive to:
i) the load age comparator finding the one of the store instructions to be older than the one of the received load instructions; and
ii) data for the one of the store instructions not being available.

10. A microprocessor comprising the apparatus of claim 1.

11. A method comprising:
receiving store instructions;
comparing an address of one of the received store instructions with addresses of store instructions allocated in a speculative store buffer memory;
comparing an age of the one of the received store instructions with an age of one of the store instructions allocated in the speculative store buffer memory responsive to finding a match between the address of the one of the received store instructions and the address of the one of the store instructions; and
replacing the one of the store instructions allocated in the speculative store buffer memory with the one of the received store instructions responsive to the one of the store instructions allocated in the speculative store buffer memory being younger than the one of the received store instructions.

12. The method of claim 11, further comprising:
allocating the one of the received store instructions to the speculative store buffer memory responsive to finding no match between the address of the one of the received store instructions and the addresses of the store instructions allocated in the speculative store buffer memory.

13. The method of claim 11, further comprising:
issuing the store instructions to be received speculatively and out of order.

14. The method of claim 12, further comprising:
buffering the received store instruction in an instruction buffer;
committing the one of the received store instructions to a memory subsystem, and removing the one of the received store instructions from the instruction buffer, responsive to:
i) all older store instructions completing;
ii) all older load instructions completing;
iii) the one of the received store instructions being not speculative; and
iv) data for the one of the received store instructions being available.

15. The method of claim 14, further comprising:
buffering speculative load instructions in a load tracking buffer;
comparing the address of the one of the received store instructions with addresses of the speculative load instructions in the load tracking buffer; and restarting execution of a program comprising the store instructions from an oldest one of the speculative load instructions having a matching address responsive to the address of the one of the received store instructions matching an address of an older one of the speculative load instructions.

16. Non-transitory computer-readable media embodying instructions executable by a computer to perform functions comprising:

receiving store instructions;

comparing an address of one of the received store instructions with addresses of store instructions allocated in a speculative store buffer memory;

comparing an age of the one of the received store instructions with an age of one of the store instructions allocated in the speculative store buffer memory responsive to finding a match between the address of the one of the received store instructions and the address of the one of the store instructions; and replacing the one of the store instructions allocated in the speculative store buffer memory with the one of the received store instructions responsive to the one of the store instructions allocated in the speculative store buffer memory being younger than the one of the received store instructions.

17. The computer-readable media of claim 16, wherein the functions further comprise:

allocating the one of the received store instructions to the speculative store buffer memory responsive to finding no match between the address of the one of the received store instructions and the addresses of the store instructions allocated in the speculative store buffer memory.

18. The computer-readable media of claim 16, wherein the functions further comprise:

issuing the store instructions speculatively and out of order.

19. The computer-readable media of claim 17, wherein the functions further comprise:

buffering the received store instruction in an instruction buffer;

committing the one of the received store instructions to a memory subsystem, and removing the one of the received store instructions from the instruction buffer, responsive to:
   i) all older store instructions completing;
   ii) all older load instructions completing;
   iii) the one of the received store instructions being not speculative; and
   iv) data for the one of the received store instructions being available.

20. The computer-readable media of claim 19, wherein the functions further comprise:

buffering speculative load instructions in a load tracking buffer;

comparing the address of the one of the received store instructions with addresses of the speculative load instructions in the load tracking buffer; and restarting execution of a program comprising the store instructions from an oldest one of the speculative load instructions having a matching address responsive to the address of the one of the received store instructions matching an address of an older one of the speculative load instructions.

\* \* \* \* \*